United States Patent
Jang et al.

(10) Patent No.: US 9,154,741 B2
(45) Date of Patent: Oct. 6, 2015

(54) APPARATUS AND METHOD FOR PROCESSING DATA OF HETEROGENEOUS SENSORS IN INTEGRATED MANNER TO CLASSIFY OBJECTS ON ROAD AND DETECT LOCATIONS OF OBJECTS

(71) Applicant: Electronics and Telecommunications Research Institute, Daejeon (KR)

(72) Inventors: Jeong-Ah Jang, Daejeon (KR); Dong-Yong Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 407 days.

(21) Appl. No.: 13/683,753

(22) Filed: Nov. 21, 2012

(65) Prior Publication Data
US 2013/0307981 A1    Nov. 21, 2013

(30) Foreign Application Priority Data
May 15, 2012   (KR) .................. 10-1012-0051614

(51) Int. Cl.
| | | |
|---|---|---|
| H04N 7/18 | (2006.01) | |
| G01S 17/87 | (2006.01) | |
| G08G 1/015 | (2006.01) | |
| G05G 1/04 | (2006.01) | |
| G08G 1/04 | (2006.01) | |
| G06K 9/00 | (2006.01) | |

(52) U.S. Cl.
CPC *H04N 7/18* (2013.01); *G01S 17/87* (2013.01); *G06K 9/00785* (2013.01); *G08G 1/015* (2013.01); *G08G 1/04* (2013.01)

(58) Field of Classification Search
CPC .......... G08G 1/15; G08G 1/104; G08G 1/33; G08G 1/16; G08G 1/164; G06K 9/00785; G06K 9/00362
See application file for complete search history.

(56) References Cited

U.S. PATENT DOCUMENTS

| | | | | |
|---|---|---|---|---|
| 2009/0289812 | A1* | 11/2009 | Kim et al. ..................... | 340/905 |
| 2010/0020074 | A1* | 1/2010 | Taborowski et al. .......... | 345/420 |
| 2010/0079590 | A1* | 4/2010 | Kuehnle et al. ............... | 348/118 |
| 2010/0246897 | A1* | 9/2010 | Lehning ....................... | 382/106 |
| 2010/0250064 | A1* | 9/2010 | Ota et al. ....................... | 701/36 |
| 2010/0253541 | A1* | 10/2010 | Seder et al. ................... | 340/905 |
| 2010/0253594 | A1* | 10/2010 | Szczerba et al. ................. | 345/7 |

(Continued)

FOREIGN PATENT DOCUMENTS

KR    10-2011-0099992 A    9/2011

*Primary Examiner* — Brian Yenke
(74) *Attorney, Agent, or Firm* — Rabin & Berdo, P.C.

(57) ABSTRACT

Disclosed herein are an apparatus and method for processing the data of heterogeneous sensors in an integrated manner to classify one or more objects on a road and detect the locations of the objects. The apparatus includes a camera image processing unit, a scanning information processing unit, and an integrated processing unit. The camera image processing unit generates the results of the processing of camera images based on the camera images collected from one or more cameras. The scanning information processing unit generates the results of the processing of scanning information based on the scanning information collected from one or more laser scanners. The integrated processing unit generates the types and final locations of the objects located on the road by processing the generated results of the processing of the camera images and the generated results of the processing of the scanning information in an integrated manner.

18 Claims, 11 Drawing Sheets

(56) References Cited

U.S. PATENT DOCUMENTS

| | | | |
|---|---|---|---|
| 2010/0280751 A1* | 11/2010 | Breed | 701/207 |
| 2010/0292886 A1* | 11/2010 | Szczerba et al. | 701/29 |
| 2011/0040481 A1* | 2/2011 | Trombley et al. | 701/301 |
| 2011/0102195 A1* | 5/2011 | Kushi et al. | 340/905 |
| 2011/0313665 A1* | 12/2011 | Lueke et al. | 701/301 |
| 2012/0093372 A1* | 4/2012 | Liu | 382/106 |
| 2012/0123640 A1* | 5/2012 | Mukaiyama | 701/36 |
| 2013/0057686 A1* | 3/2013 | Genc et al. | 348/148 |
| 2013/0141576 A1* | 6/2013 | Lord et al. | 348/148 |
| 2013/0144490 A1* | 6/2013 | Lord et al. | 701/41 |
| 2013/0197736 A1* | 8/2013 | Zhu et al. | 701/26 |
| 2014/0111647 A1* | 4/2014 | Atsmon et al. | 348/148 |
| 2014/0195138 A1* | 7/2014 | Stelzig et al. | 701/119 |
| 2014/0232566 A1* | 8/2014 | Mimeault et al. | 340/935 |
| 2014/0240167 A1* | 8/2014 | Cho | 342/104 |
| 2014/0362195 A1* | 12/2014 | Ng-Thow-Hing et al. | 348/51 |

* cited by examiner

| ITEM | ATTRIBUTE | OPTION |
| --- | --- | --- |
| SENSOR TYPE | CAMERA, LASER SCANNER, OTHERS | ESSENTIAL |
| LOCATION OF INSTALLATION | LATITUDE X, LONGITUDE Y | ESSENTIAL |
| HEIGHT OF INSTALLATION | H | ESSENTIAL |
| ANGLE OF INSTALLATION | θ | ESSENTIAL |
| ROAD NUMBER | INTEGER | OPTIONAL |
| START NODE (NODE 1) | LATITUDE X, LATITUDE Y | OPTIONAL |
| END NODE (NODE 2) | LATITUDE X, LATITUDE Y | OPTIONAL |
| NUMBER OF TRAFFIC LANES | INTEGER | OPTIONAL |

FIG. 8

| ITEM | ATTRIBUTE |
| --- | --- |
| SENSOR NUMBER | INTEGER |
| LOCATION OF INSTALLATION | LATITUDE X, LATITUDE Y |
| HEIGHT OF INSTALLATION | H |
| ANGLE OF INSTALLATION | θ |

FIG. 9

| ITEM | ATTRIBUTE |
|---|---|
| ROAD NUMBER | INTEGER |
| START NODE (NODE 1) | LATITUDE X, LATITUDE Y |
| END NODE (NODE 2) | LATITUDE X, LATITUDE Y |
| NUMBER OF TRAFFIC LANES | INTEGER |

FIG. 10

APPARATUS AND METHOD FOR PROCESSING DATA OF HETEROGENEOUS SENSORS IN INTEGRATED MANNER TO CLASSIFY OBJECTS ON ROAD AND DETECT LOCATIONS OF OBJECTS

CROSS REFERENCE TO RELATED APPLICATION

This application claims the benefit of Korean Patent Application No. 10-2012-0051614, filed on May 15, 2012, which is hereby incorporated by reference in its entirety into this application.

BACKGROUND OF THE INVENTION

1. Technical Field

The present invention relates generally to an apparatus and method for processing the data of heterogeneous sensors in an integrated manner to classify objects on a road and detect the locations of the objects and, more particularly, to an apparatus and method for processing the data of heterogeneous sensors in an integrated manner to classify objects on a road and detect the locations of the objects, which are capable of classifying objects on a road and also detecting the locations of the objects using heterogeneous sensors, that is, cameras and laser scanners, installed on the sides of the road.

2. Description of the Related Art

With the development of an Intelligent Transport System (ITS), roads have been gradually intellectualized. As part of this trend, road monitoring cameras, such as Closed-Circuit Television (CCTV) cameras and image detectors, have been widely installed and popularized to monitor vehicles and pedestrians on roads. Recently, a variety of methods have been proposed, such as a method of tracking and classifying vehicles using laser scanner sensors and then providing information to drivers or supporting autonomous driving.

Up to the present, a method of detecting vehicles on roads using cameras, such as CCTV cameras, has been chiefly used to monitor roads. As an example, Korean Patent Application Publication No. 10-2011-0099992 entitled "Real-time Traffic Situation Detection System" is configured to analyze the speed, type and traffic of vehicles by analyzing images captured using road image cameras installed on roads, bridges and/or tunnels and store an image when the analyzed information indicates that a situation has suddenly occurred.

As described above, CCTV cameras have the advantage of readily fulfilling multiple traffic lane, multiple detection requirements. However, existing detection technology using image cameras has the following problems. Since image cameras are installed in diagonal directions, an occlusion problem inevitably occurs. In order to solve this problem, image cameras are installed using tall poles. Nevertheless, the occlusion problem still remains. When traffic is not smooth, as in traffic congestion, vehicles are occluded and thus it is difficult to acquire information about the locations and speeds of vehicles. Furthermore, image cameras are sensitive to environmental factors, such as a tremendous snowfall, a heavy rainfall, day, and night and the reliability of classification and location estimation may be low because of the deterioration of image quality. A reflection effect may be generated by a road surface as in the case of the presence of a water film, erroneous detection is generated by the reflected light of a headlight, speed measurement errors occur, and erroneous detection is generated by a shadow.

In order to mitigate the above problems, laser scanners are installed on the sides of roads, so that the rate of classification of objects, such as vehicles, pedestrians and obstacles, can be increased and accurate location information can be obtained. Laser scanners are sensors that detect objects using distance values obtained using the reflection of light. Existing laser scanners are installed on vehicles, are configured to detect objects in front of, behind and beside the vehicles and calculate distance values, and are used in unmanned autonomous vehicles.

When such laser scanners are installed on the sides of roads or intersections, there are the advantages of rapidly detecting facilities, moving vehicles, pedestrians and obstacles on roads in real time from fixed locations where the laser scanners are installed and detecting accurate distances. Nevertheless, occluded objects are inevitably detected depending on the scan angle. There is a need for a method that mitigates this problem.

SUMMARY OF THE INVENTION

Accordingly, the present invention has been made keeping in mind the above problems occurring in the prior art, and an object of the present invention is to provide an apparatus and method for processing the data of heterogeneous sensors in an integrated manner to classify objects on a road and detect the locations of the objects, which are capable of processing the information collected from heterogeneous sensors, such as cameras and laser scanners, in an integrated manner, thereby classifying objects on a road and detecting the locations of the objects.

In order to accomplish the above object, the present invention provides an apparatus for processing data of heterogeneous sensors in an integrated manner to classify one or more objects on a road and detect locations of the objects, the apparatus including a camera image processing unit configured to generate results of processing of camera images based on the camera images collected from one or more cameras installed on the road; a scanning information processing unit configured to generate results of processing of scanning information based on the scanning information collected from one or more laser scanners installed on the road; and an integrated processing unit configured to generate types and final locations of the objects located on the road by processing the generated results of the processing of the camera images and the generated results of the processing of the scanning information in an integrated manner.

The camera image processing unit may detect a length of a sensible road based on a height and angle of each of the installed cameras included in previously stored camera information; and detect a road area and a non-road area based on variations in color between pixels of the received camera images and then detects a width of the road.

The camera image processing unit may detect types of objects located on the road based on previously stored reference objects and pixel groups of the camera images, and sets an object type ID for each of the objects based on the detected types of objects; may convert the objects detected from the camera images into rectangles, and detect a location in which diagonals of each of the resulting rectangles intersect each other as an object center location of a corresponding object; and generate the results of the processing of the camera images including object type IDs and object center locations of the objects located on the road.

The scanning information processing unit may detect the estimated locations of the objects located on the road by performing multiple data processing on location information included in laser scanner information associated with sensor numbers of the laser scanners and the received scanning information.

The scanning information processing unit may generate a road sensing map based on a direction vector of motion of each of the objects depending on a test drive or an initial driving situation of a vehicle over a predetermined period of time or based on previously stored road information; may classify the objects located on the road as one or more moving objects and/or one or more fixed objects based on data monitoring of the road area based on the generated road sensing map, and detect the sizes and distribution of sensing points of the moving objects and the fixed objects; and may perform an object identity test based on sizes and a distribution of the detected sensing points, sets object IDs, and groups the objects based on the set object IDs.

The scanning information processing unit may generate the results of the processing of the scanning information including object IDs, types of grouping, and estimated locations.

The integrated processing unit may map the objects on the road to an integrated object sensing map composed of grid cells based on the results of the processing of the camera images and the results of the processing of the scanning information; may calculate the period and probability of each of grid cells of the integrated object sensing map, to which the objects have been mapped, being occupied; if the calculated probability of being occupied is equal to or higher than a set threshold value, may determine an identity for each grid cell by comparing an object type ID of an object occupying the grid cell with an object ID of the object, and, if the identity for each grid cell is normal, sets an object type ID for the grid cell; and may set the average representative location of estimated locations of the results of processing of the laser scanner-related information as a final location of a corresponding object.

The integrated processing unit may generate the results of the integrated processing including collection times, object type IDs and object locations.

The apparatus may further include a storage unit configured to store heterogeneous sensor information including at least one of a sensor type, location, height and angle of each of the installed cameras and laser scanners, and a road number on which each of the installed cameras and laser scanners is installed, and road information including at least one of a road number, a start node, an end node, and a number of traffic lanes.

The apparatus may further include a transmission unit configured to send the results of the integrated processing generated by the integrated processing unit to a vehicle or one or more other information servers.

In order to accomplish the above object, the present invention provides a method of processing data of heterogeneous sensors in an integrated manner to classify one or more objects on a road and detect locations of the objects, the method including generating, by a camera image processing unit, results of processing of camera images based on the camera images collected from one or more cameras installed on the road; generating, by a scanning information processing unit, results of processing of scanning information based on the scanning information collected from one or more laser scanners installed on the road; and generating, by an integrated processing unit, types and final locations of the objects located on the road by processing the generated results of the processing of the camera images and the generated results of the processing of the scanning information in an integrated manner.

The generating the results of the processing of the camera images may include extracting, by the camera image processing unit, a road area based on camera information detected from a storage unit and variations in color between pixels of the camera images; extracting, by the camera image processing unit, the objects from the camera images based on reference objects stored in the storage unit; detecting, by the camera image processing unit, the types of objects on the road based on previously stored reference objects and pixel groups of the camera images, and then setting, by the camera image processing unit, object type IDs for the objects; converting, by the camera image processing unit, the extracted objects into rectangles, and then extracting, by the camera image processing unit, a location at which diagonals of each of the rectangles intersect each other as an object center location of a corresponding object; and generating, by the camera image processing unit, the results of the processing of the camera images including the set object type IDs and object center locations.

The extracting a road area may include detecting, by the camera image processing unit, camera information including a height and angle of each of the installed cameras from the storage unit; detecting, by the camera image processing unit, a length of a sensible road based on the detected camera information; detecting, by the camera image processing unit, a road area and a non-road area based on variations in color between pixels of the received camera images; and detecting, by the camera image processing unit, a width of the road based on the detected road area and non-road area.

The generating results of the processing of the scanning information may include detecting, by the scanning information processing unit, estimated locations of the objects on the road by performing multiple data processing on laser scanner information and the scanning information; generating, by the scanning information processing unit, a road sensing map based on a direction vector of motion of each of the objects depending on a test drive or an initial driving situation of a vehicle over a predetermined period of time or based on previously stored road information; performing, by the scanning information processing unit, an object identity test based on sizes and a distribution of sensing points of the objects mapped to the generated road sensing map; grouping, by the scanning information processing unit, objects based on results of the object identity test; and generating, by the scanning information processing unit, the results of the processing of the scanning information including object IDs, types of grouping, and the estimated locations.

The performing an object identity test may include setting, by the scanning information processing unit, a same object ID for same objects; and the grouping the objects may include grouping, by the scanning information processing unit, the objects for which the same object ID has been set as a group.

The generating types and final locations of the objects may include mapping, by the integrated processing unit, the received results of the processing of the camera images and the received results of the processing of the scanning information to an integrated object sensing map; calculating, by the integrated processing unit, a period and probability of each of grid cells of the integrated object sensing map being occupied; determining, by the integrated processing unit, an identity for each grid cell based on the calculated probability of the grid cell being occupied; if the identity for each grid cell is normal, classifying, by the integrated processing unit, the objects for the corresponding grid cells; estimating, by the integrated processing unit, locations of the classified objects; and generating, by the integrated processing unit, results of the integrated processing.

The determining an identity for each grid cell may include comparing, by the integrated processing unit, the calculated probability of being occupied with a set threshold value; if the probability of being occupied is equal to or higher than the set threshold value, determining, by the integrated processing unit, the identity for each grid cell by comparing an object type ID of an object occupying the corresponding grid cell with an object ID of the object; and if the identity for each grid cell is normal, setting, by the integrated processing unit, an object type ID for the corresponding grid cell.

The estimating locations of the objects may include setting, by the integrated processing unit, an average representative location of estimated locations of the results of processing of the laser scanner-related information as a final location of a corresponding object.

The generating the results of the integrated processing may include generating, by the integrated processing unit, results of the integrated processing including collection times, object type IDs and object locations.

The method may further include sending, by a transmission unit, the results of the integrated processing generated by the integrated processing unit to a vehicle or one or more other information servers.

BRIEF DESCRIPTION OF THE DRAWINGS

The above and other objects, features and advantages of the present invention will be more clearly understood from the following detailed description taken in conjunction with the accompanying drawings, in which:

FIGS. 8 to 10 are diagrams illustrating the storage unit of FIG. 2;

DESCRIPTION OF THE PREFERRED EMBODIMENTS

The embodiments of the present invention will be described with reference to the accompanying drawings in order to fully describe the present invention so that persons having ordinary skill in the art can easily practice the technical spirit of the present invention. It should be noted that like reference symbols are used to designate like elements throughout the drawings even when the elements are illustrated in different drawings. Furthermore, in the following description of the present invention, detailed descriptions of one or more related well-known constructions and/or one or more functions which have been deemed to make the gist of the present invention unnecessarily vague will be omitted.

Figure 1:
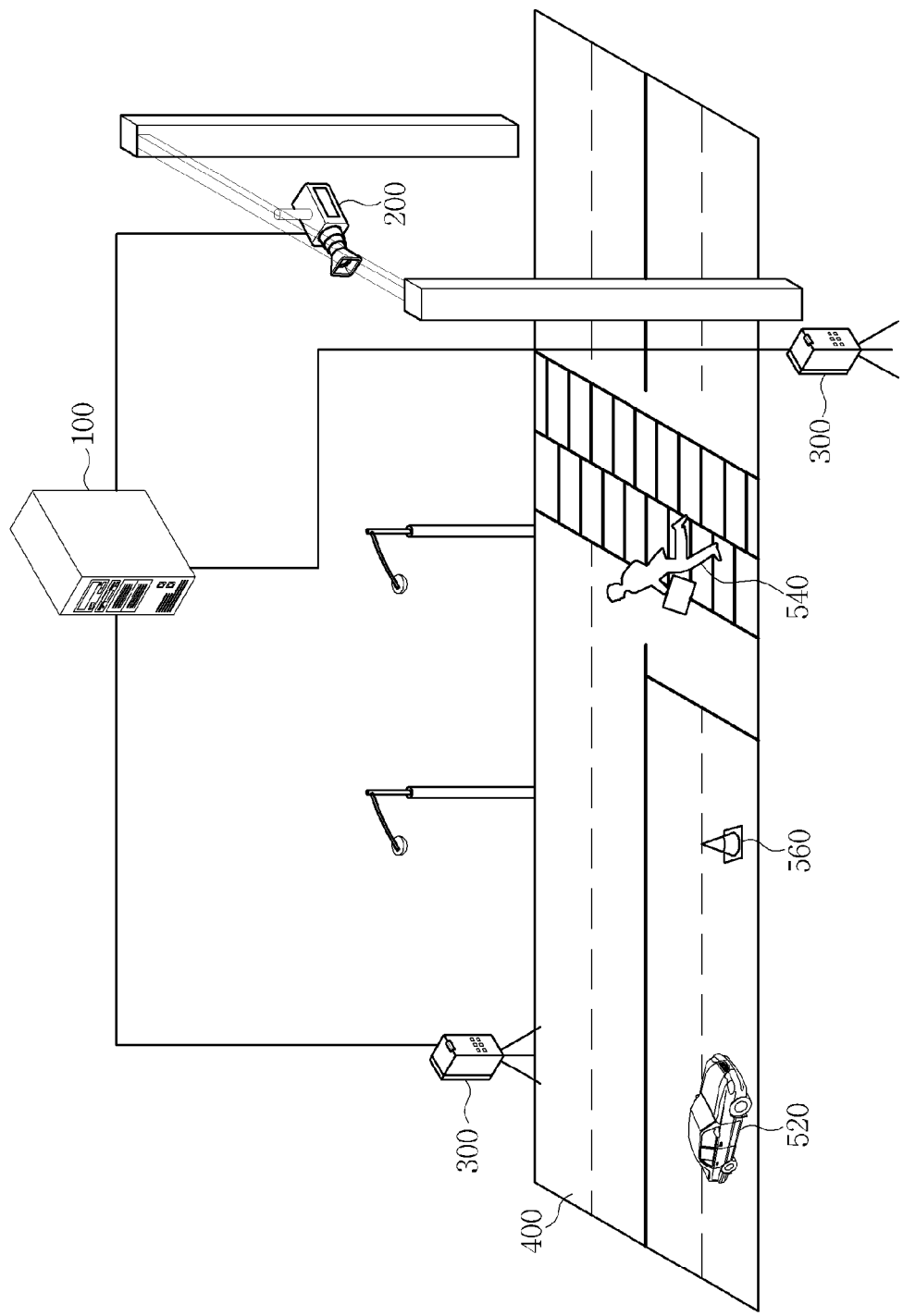
FIG. 1 is a diagram illustrating an apparatus for processing the data of heterogeneous sensors in an integrated manner to classify objects on a road and detect the locations of the objects according to an embodiment of the present invention.
Figure 2:
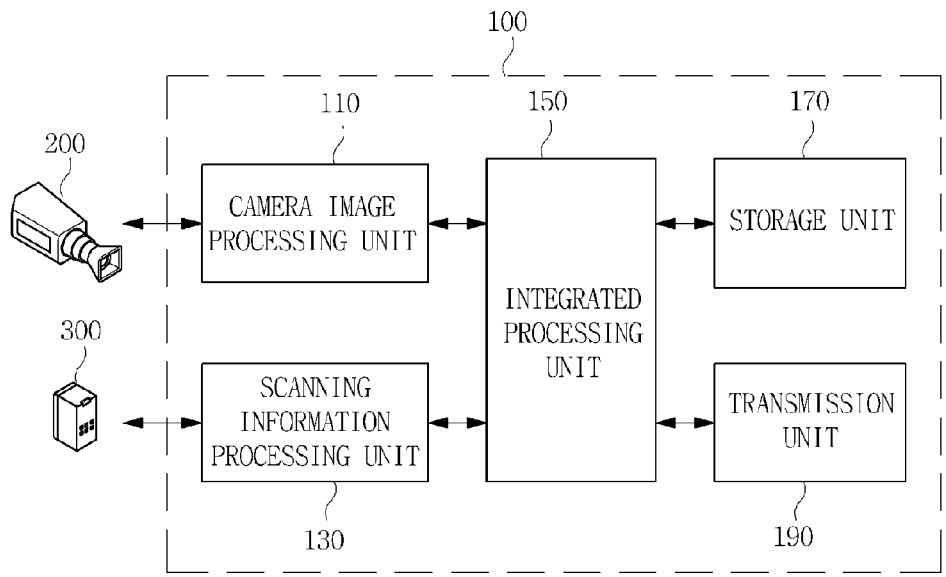
FIG. 2 is a diagram illustrating the configuration of the apparatus for processing the data of heterogeneous sensors in an integrated manner to classify objects on a road and detect the locations of the objects according to the embodiment of the present invention shown in FIG. 1.
Figure 3:
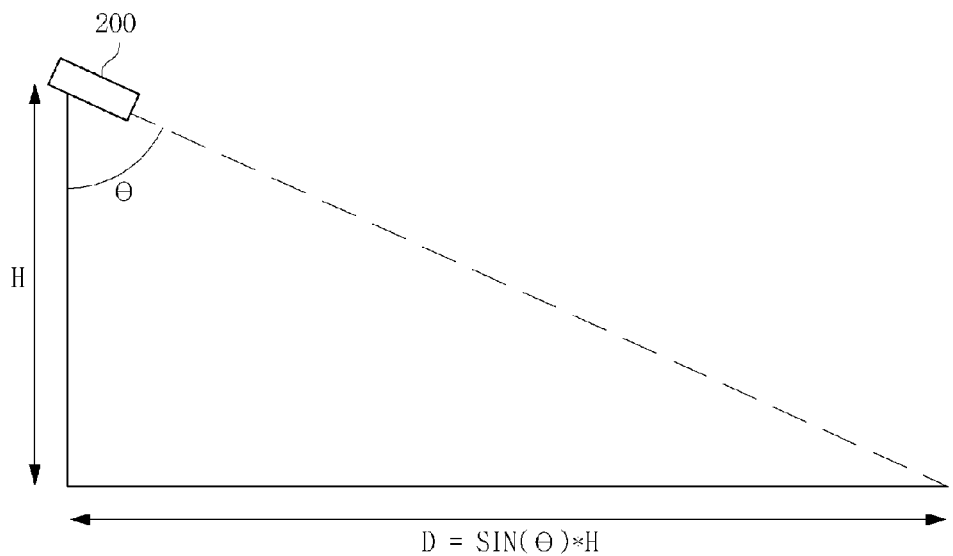
FIG. 3 is a diagram illustrating the camera image processing unit of FIG. 2.
Figure 5:
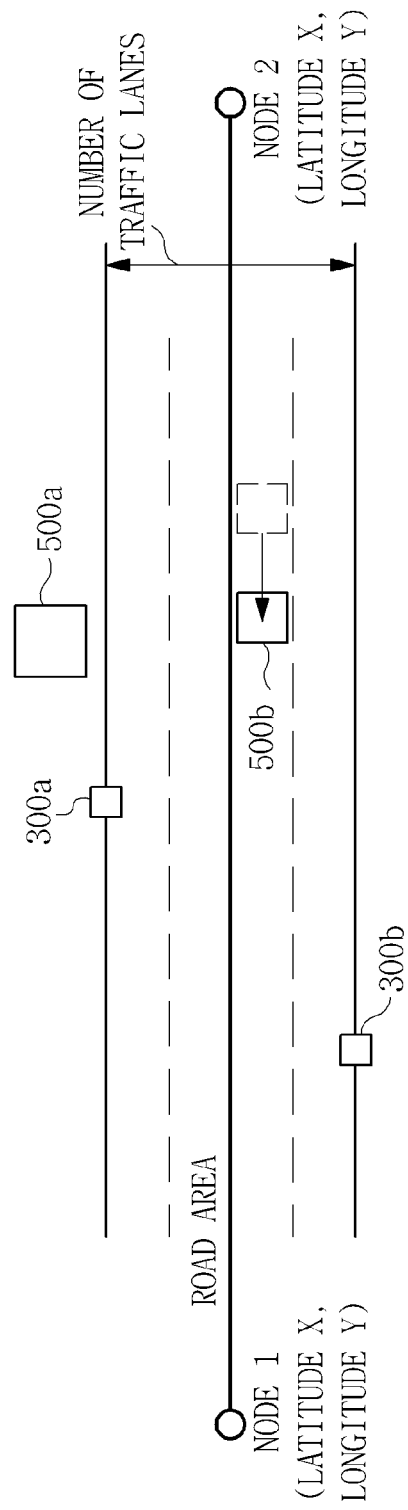
Figure 6:
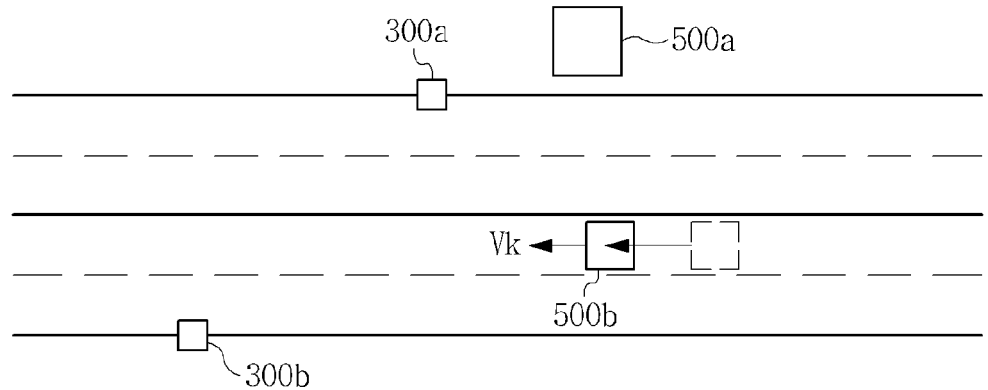
Figure 7:
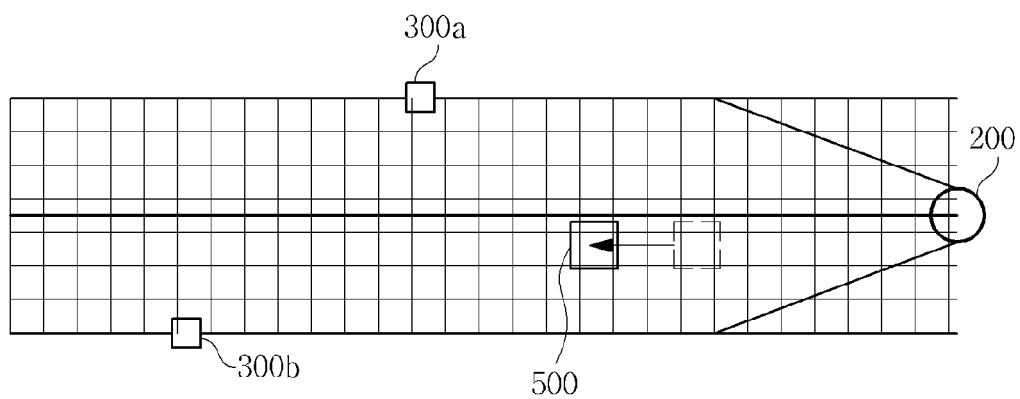
FIG. 7 is a diagram illustrating the integrated processing unit of FIG. 2.

An apparatus for processing the data of heterogeneous sensors in an integrated manner to classify objects on a road and detect the locations of the objects according to an embodiment of the present invention will be described with reference to the accompanying drawings. FIG. 1 is a diagram illustrating an apparatus for processing the data of heterogeneous sensors in an integrated manner to classify objects on a road and detect the locations of the objects according to an embodiment of the present invention, FIG. 2 is a diagram illustrating the configuration of the apparatus for processing the data of heterogeneous sensors in an integrated manner to classify objects on a road and detect the locations of the objects according to the embodiment of the present invention shown in FIG. 1. FIG. 3 is a diagram illustrating the camera image processing unit of FIG. 2, FIGS. 4 to 6 are diagrams illustrating the scanning information processing unit of FIG. 2, FIG. 7 is a diagram illustrating the integrated processing unit of FIG. 2, and FIGS. 8 to 10 are diagrams illustrating the storage unit of FIG. 2. In order to help to understand the present invention, an example in which integrated processing is performed using heterogeneous sensors composed of a camera and a laser scanner will be described below. It will be apparent that a variety of sensors other than a camera and a laser scanner may be used.

As shown in FIG. 1, an apparatus 100 for processing the data of heterogeneous sensors in an integrated manner classifies objects 500 (520, 540 and 560) located along a road 400 using information received from heterogeneous sensors installed on the road 400. For this purpose, the apparatus 100 for processing the data of heterogeneous sensors in an integrated manner receives information from one or more laser scanners 300 and one or more cameras 200 (for example, a CCTV camera) on the road 400 via wired and/or wireless networks.

The apparatus 100 for processing the data of heterogeneous sensors in an integrated manner detects the locations of the classified objects 500 using the information received from the heterogeneous sensors on the road 400. Here, the heterogeneous sensors include the camera 200 and the laser scanner 300. The apparatus 100 for processing the data of heterogeneous sensors in an integrated manner receives information from one or more sensors for each of the types of sensors.

The apparatus 100 for processing the data of heterogeneous sensors in an integrated manner performs primary data processing on camera images received from the cameras 200. The apparatus 100 for processing the data of heterogeneous sensors in an integrated manner performs primary data processing on scanning information received from the laser scanners 300. The apparatus 100 for processing the data of heterogeneous sensors in an integrated manner classifies the objects 500 located on the road 400 and then detects the locations of the objects 500 using the results of the primary data processing of the camera images and the scanning information and previously stored sensor information.

The apparatus 100 for processing the data of heterogeneous sensors in an integrated manner converts information about the classification and locations of the objects into a form that can be used in internal and/or external hardware or software. The apparatus 100 for processing the data of heterogeneous sensors in an integrated manner sends the resulting information about the classification and locations of the objects to the corresponding hardware or software.

Using the above process, the apparatus 100 for processing the data of heterogeneous sensors in an integrated manner classifies the objects 500 located on the road 400 as a vehicle 520, a pedestrian 540, an obstacle 560, etc. The apparatus 100 for processing the data of heterogeneous sensors in an integrated manner detects the accurate locations of the classified objects 500. The apparatus 100 for processing the data of heterogeneous sensors in an integrated manner sends the results of the integrated processing (that is, the classification and locations of the objects) to one or more entering vehicles or a road administrator using a method, such as wired/wireless vehicle-to-infrastructure communication.

For this purpose, as shown in FIG. 2, the apparatus 100 for processing the data of heterogeneous sensors in an integrated manner includes a camera image processing unit 110, a scanning information processing unit 130, an integrated processing unit 150, a storage unit 170, and a transmission unit 190. Here, the apparatus 100 for processing the data of heterogeneous sensors in an integrated manner may be configured in the form of hardware or software.

The camera image processing unit 110 receives camera images from the cameras 200 installed on the road 400. That is, the cameras 200 installed on the road 400 capture images of the road 400, and send the captured images to the camera image processing unit 110 over the wired/wireless network. Accordingly, the camera image processing unit 110 receives the captured images from the cameras 200.

The camera image processing unit 110 detects a road area from previously stored camera information and the received camera images.

The camera image processing unit 110 detects the length of the road 400 from the previously stored camera information. That is, the camera image processing unit 110 detects the length of a road using camera information. For this purpose, the camera image processing unit 110 detects camera information stored in the storage unit 170. At this time, the camera image processing unit 110 detects camera information, including the sensor number, location (X, Y), height H and angle θ of each of the cameras, from the storage unit 170. The camera image processing unit 110 detects the sensible length of the road 400 using the detected camera information. That is, as shown in FIG. 3, the camera image processing unit 110 detects the sensible length of the road 400 using the height and angle of the camera 200 included in the camera information.

The camera image processing unit 110 detects the width of the road 400 from the received camera images. That is, the camera image processing unit 110 detects the width of the road 400 using variations in color between the individual pixels of the camera images. Here, the camera image processing unit 110 detects a road area and a non-road area using variations in color between the individual pixels of the camera images. The camera image processing unit 110 detects the width of the road area as the width of the road 400 using variations in color between the individual pixels of the camera images of the detected road area.

The camera image processing unit 110 extracts one or more objects from the camera images based on previously stored reference objects. That is, the camera image processing unit 110 extracts the objects by comparing the reference objects stored in the storage unit 170 with the pixel groups of the camera images. For this purpose, the camera image processing unit 110 detects reference objects for a vehicle, a human and an obstacle from the storage unit 170. The camera image processing unit 110 detects an object corresponding to the vehicle, an object corresponding to the human, and an object corresponding to the obstacle from the camera images by comparing the detected reference objects with the pixel groups of the camera images.

The camera image processing unit 110 sets an ID for each of the types of previously detected objects. That is, the camera image processing unit 110 sets object type IDs, which were set for the reference objects, for previously detected objects.

The camera image processing unit 110 detects the object center locations of the previously detected objects. That is, the camera image processing unit 110 converts each object into a rectangle. The camera image processing unit 110 detects a location at which the diagonals of the resulting rectangle intersect each other as the object center location of the object.

The camera image processing unit 110 sends the results of the camera image processing to the integrated processing unit 150. That is, camera image processing unit 110 sends the results of the camera image processing, including the set object type IDs and the detected object center locations, to the integrated processing unit 150.

The scanning information processing unit 130 collects scanning information received from the one or more laser scanners 300 installed on the road 400. That is, the scanning information processing unit 130 receives scanning information, including information about the distances to the objects 500 at each angle, from the one or more laser scanner 300. Here, the scanning information processing unit 130 receives information about the distances to the objects 500 at each angle, collected on a cm-unit basis, from the laser scanners 300. In this case, the laser scanners 300 are installed on the sides of the road 400, and scan a range from 0° to 180° in parallel with the road 400. Accordingly, the laser scanner 300 may measure the distance from the left side of the road 400 to the right side thereof and the distances to the objects 500.

Figure 4:
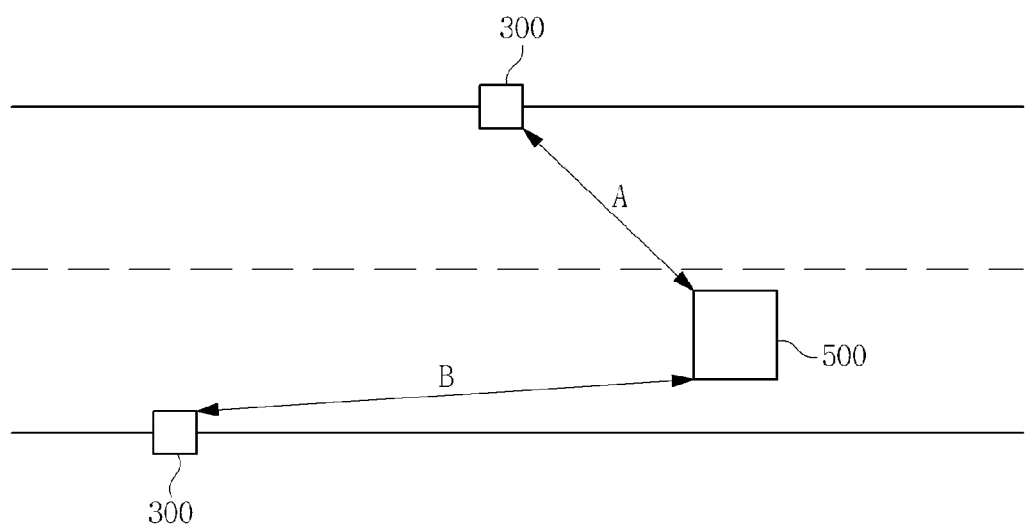
FIGS. 4 to 6 are diagrams illustrating the scanning information processing unit of FIG. 2.

The scanning information processing unit 130 detects the estimated locations (X', Y') of the objects 500 located on the sides of the road 400 by performing multiple data processing on the received scanning information. For this purpose, the scanning information processing unit 130 detects laser scanner information based on the sensor number of the laser scanner 300 that has sent the scanning information. That is, the scanning information processing unit 130 detects laser scanner information associated with a sensor number that is the same as the sensor number of the laser scanner 300, from the storage unit 170. At this time, the scanning information processing unit 130 detects the laser scanner information, including the location information of the laser scanner 300 (that is, its latitude and longitude), from the storage unit 170. The scanning information processing unit 130 detects the absolute locations of the objects 500 located on the road 400 based on the laser scanner information and the scanning information. That is, as shown in FIG. 4, the scanning information processing unit 130 detects the estimated location (X', Y') of each object 500, that is, absolute location values, using information about the location of the laser scanner 300 included in the laser scanner information and information A and B about the distance and directional angle of the object 500 included in the scanning information.

The scanning information processing unit 130 generates a road sensing map. Here, the road sensing map is a map that functions as a criterion that is used to determine which area the road area belongs to. At this time, the scanning information processing unit 130 generates the road sensing map using any one of the following two methods.

First, a method by which the scanning information processing unit 130 generates a road sensing map using road information stored in the storage unit 170 will be described below.

The scanning information processing unit 130 detects road information, including a start node, an end node, and the number of traffic lanes, from the storage unit 170. The scanning information processing unit 130 generates a center road line and a road area using the detected road information. In a situation as shown in FIG. 5, the scanning information processing unit 130 detects the estimated locations of object 1 500a and object 2 500b using scanning information received from laser scanner 1 300a and laser scanner 2 300b. The scanning information processing unit 130 detects the locations of object 1 500a and object 2 500b based on the generated road area and the detected estimated locations of object 1 500a and object 2 500b. That is, the scanning information processing unit 130 detects information about the width and line shapes of the road 400 using the generated road area. The scanning information processing unit 130 determines whether each of the objects 500a and 500b is located in a non-road area or on the road 400 by comparing the detected information about the width and line shapes of the road with the estimated locations of object 1 500a and object 2 500b. At this time, in the situation of FIG. 5, the scanning information processing unit 130 determines that object 1 500a is located in the non-road area, and determines that object 2 500b is located on the road 400.

Next, a method by which the scanning information processing unit 130 generates a road sensing map using the direction vectors of the motion of objects over time while taking into consideration the test drive or initial driving situation of a vehicle over a predetermined period of time will be described.

If the number of traffic lanes or information about the nodes of a road area cannot be detected from the storage unit 170, the scanning information processing unit 130 detects the road area using data about all objects over time (for example, over k hours) collected from the laser scanner 300.

The scanning information processing unit 130 detects one or more fixed objects from scanning information received from the laser scanners 300. That is, the scanning information processing unit 130 detects fixed objects, such as a streetlamp, a roadside tree, a road building, road facilities, etc., from the scanning information received from the laser scanners 300. In this case, the laser scanner 300 detects fixed objects using the characteristic that the fixed objects can be detected at the same locations even after k hours have passed.

The scanning information processing unit 130 detects one or more moving objects from the scanning information received from the laser scanners 300. That is, scanning information processing unit 130 detects one or more moving objects from scanning information received from the laser scanners 300 during the test drive of a vehicle or for a set initial period after installation. For this purpose, the scanning information processing unit 130 collects scanning information during the test drive of a vehicle or for a few initial minutes after installation. The scanning information processing unit 130 tracks the motion of each moving object over time by analyzing the collected scanning information. The scanning information processing unit 130 generates the direction vector Vk of a vehicle k based on the tracked motion of the object over k hours. For example, as shown in FIG. 6, the scanning information processing unit 130 receives scanning information regarding object 1 500a and object 2 500b from laser scanner 1 300a and laser scanner 1 300b for the specific period k. In this case, the scanning information processing unit 130 detects object 1 500a without a direction vector at the same location using the scanning information. The scanning information processing unit 130 detects the motion of object 2 500b, that is, $\{X(t), Y(t)\} \sim \{(t+k), Y(t+k)\}$. Accordingly, the scanning information processing unit 130 generates direction vector Vk based on the motion of object 2 500b. The scanning information processing unit 130 generates the direction vector of m (a set number) or more vehicles by tracking the motions of the vehicles. Thereafter, the scanning information processing unit 130 generates the road area based on the generated direction vectors, that is, $\{Vk, \ldots, Vm\}$. As described above, the scanning information processing unit 130 generates an initial road sensing map by making a vehicle perform test driving or by monitoring the road 400 during an initial map generation period after the laser scanners 300 have been installed on the road 400. This enables the scanning information processing unit 130 to generate an initial road sensing map, thereby obtaining basic information about a road area and a non-road area.

The scanning information processing unit 130 continuously monitors data about the road area using the configuration of the generated road map. The scanning information processing unit 130 tests the object identity of each moving object using the results of the monitoring. That is, the scanning information processing unit 130 detects the sizes and distribution of the sensing points of each moving object, such as a vehicle, a pedestrian, or some other obstacle, over time. The scanning information processing unit 130 tests each object for object identity using the detected sizes and distribution of the sensing points of each moving object. In this case, the scanning information processing unit 130 tests the identity of the object while taking into consideration the minimum distance (minimum radius) of the estimated location (X', Y') of the object 500. The scanning information processing unit 130 sets the same object ID for objects that have been estimated to be the same by the identity test.

The scanning information processing unit 130 groups the objects based on the results of the identity test. That is, the scanning information processing unit 130 groups the objects with respect to objects for which the same object ID has been set while taking into account the minimum and maximum values of the size. In this case, the scanning information processing unit 130 groups the objects depending on the types of vehicles, such as passenger vehicles and large-sized vehicles, and depending on whether they are pedestrians or the other objects.

The scanning information processing unit 130 sends the results of the processing of the scanning information to the integrated processing unit 150. In this case, the scanning information processing unit 130 sends the results of the processing of the scanning information in the form of {object ID, grouping type, estimated location (X', Y'), . . . , estimated location (X', Y')} to the integrated processing unit 150.

The integrated processing unit 150 generates the type of object (for example, a vehicle type, a human, or others) and the accurate location (X, Y) of each object based on the results of the processing of the camera images and the scanning information. That is, the integrated processing unit 150 generates the type of object, such as the type of vehicle, a human, or other objects, based on the results of the processing of the camera images and the scanning information. Furthermore, the integrated processing unit 150 generates the accurate location (X, Y) of each object based on the results of the processing of the camera images and the scanning information. For this purpose, the integrated processing unit 150 maps the results of the processing of the camera images and the scanning information to an integrated object sensing map. That is, the integrated processing unit 150 maps the results of the processing of the camera images {object type ID, object center location} and the results of the processing of the scanning information {object IDs, grouping types, estimated location (X', Y'), ..., estimated location (X', Y')} to an integrated object sensing map. Here, the integrated object sensing map is a road map in which a map is divided into grid cells of a specific size by a user and the road 400 is formed in a grid structure. As shown in FIG. 7, the integrated processing unit 150 maps the object 500 to the integrated object sensing map formed in a grid structure based on the center point location and estimated location of each object. Here, information about the size of an occupied area is approximately set for each object type ID that is collected from the results of the processing of the camera images. That is, the integrated processing unit 150 previously stores the size of the occupied area for each object type ID, for example, approximately 2 m×4.5 m for a passenger vehicle, 2.5 m×12 m for a bus, and 50 cm×50 cm for a human. The integrated processing unit 150 calculates the size of the area occupied by each object using the size of the occupied area for each object type ID and its center point location. The integrated processing unit 150 maps each object to the integrated object sensing map using the calculated size of the area occupied by the object and its center point location.

The integrated processing unit 150 calculates the period in which a grid cell of the integrated object sensing map is occupied by each object via mapping and the probability of the grid cell being occupied. That is, the integrated processing unit 150 calculates the period in which a grid cell of the integrated object sensing map is occupied depending on the location of each object and the probability of the grid cell being occupied.

The integrated processing unit 150 performs identity determination for each grid cell based on the calculated probability of each grid cell being occupied. That is, the integrated processing unit 150 compares the probability of each grid cell being occupied based on the results of the processing of the camera images with a set threshold value. The integrated processing unit 150 compares the probability of each grid cell being occupied based on the results of the processing of the scanning information with a set threshold value. The integrated processing unit 150, if the probability of being occupied based on the results of the processing of the camera images and the probability of being occupied based on the results of the processing of the scanning information are larger than the set threshold values, respectively, determines the identity for each grid cell depending on whether the two groups of results are present in the grid cell. In this case, the integrated processing unit 150 determines whether the corresponding grid cell is occupied by the same object by comparing the object type ID of the results of the processing of the camera images with the object ID of the results of the processing of the scanning information. The integrated processing unit 150 determines that identity for each grid cell is normal if the corresponding grid cell is occupied by the same object, and determines that identity for each grid cell is abnormal if the corresponding grid cell is not occupied by the same object.

The integrated processing unit 150 sets the object type ID of the results of the processing of the camera images as the corresponding grid cell value in a corresponding sensing period if the identity for each grid cell is normal. The integrated processing unit 150 performs object tracking if the identity for each grid cell is abnormal. That is, the integrated processing unit 150 re-determines the identity for each grid cell by comparing the corresponding object type ID of the results of the processing of the camera images with the corresponding object ID of the results of the processing of the scanning information if the motion of the object is detected in a subsequent sensing period. In this case, the integrated processing unit 150 performs object tracking in a subsequent period if the identity for each grid cell is abnormal after object tracking has been performed. The integrated processing unit 150 performs identity determination again if the identity for each grid cell is abnormal in the subsequent period.

The integrated processing unit 150 generates the results of the integrated processing, and then sends them to the transmission unit 190. That is, once the setting of an object type ID for each grid cell has been completed by determining the identity for each grid cell, the integrated processing unit 150 sets the average representative location of the estimated locations collected from the results of the processing of the laser scanner-related information, that is, {estimated location (X', Y'), estimated location (X', Y')}, as the final location of the corresponding object. The integrated processing unit 150 sends the results of the integrated processing, including {collection time, object type ID, object location}, to the transmission unit 190.

The storage unit 170 stores heterogeneous sensor information. That is, the storage unit 170 stores information about the heterogeneous sensors, such as the cameras 200, the laser scanners 300, etc. installed on the road 400. Here, as shown in FIG. 8, the storage unit 170 stores information about the heterogeneous sensors, such as the type, location, height, angle, and road number of each sensor. In this case, the storage unit 170 stores information about heterogeneous sensors so that it is divided into necessary and optional items. The storage unit 170 stores information about the installation of heterogeneous sensors (that is, the location, height, angle and road number of each sensor, start and end nodes, and the number of traffic lanes), when the heterogeneous sensors are installed. The storage unit 170 stores the absolute coordinates of the longitude and latitude of each heterogeneous sensor as the location of the heterogeneous sensor. It will be apparent that the storage unit 170 may store the relative coordinates of the heterogeneous sensors suitable for the road area as the location when the sensor was installed.

The storage unit 170 stores information about the cameras 200 that were installed on the road 400. That is, as shown in FIG. 9, the storage unit 170 stores the camera information, such as the sensor numbers, locations (X, Y), heights H and angles θ of the installed cameras 200.

The storage unit 170 stores information about the laser scanners 300 installed on the road 400. That is, the storage unit 170 stores the laser scanner information, including the sensor numbers, locations (X, Y), heights H and angles θ of the installed laser scanners 300.

The storage unit 170 stores road information that the scanning information processing unit 130 uses to generate the road sensing map. That is, as shown in FIG. 10, the storage unit 170 stores road information including a road number, a start node, an end node, and the number of traffic lanes. Here, the storage unit 170 stores the absolute coordinates of the longitude and latitude of the start and end nodes as the start and end nodes of the road 400. It will be apparent that the storage unit 170 may store the relative coordinates of the start and end nodes suitable for the road area as the start and end nodes.

The transmission unit 190 sends the results of the integrated processing received from the integrated processing unit 150 to a driver or other information servers. That is, the transmission unit 190 sends the results of the integrated processing, including collection times, object type IDs and object locations, to a driver or other information servers.

When the transmission unit 190 sends the results of the integrated processing to a driver, it may directly notify the driver of danger via wireless Vehicle-to-Infrastructure (V2I) communication between an infrastructure and a vehicle. This enables the driver to become aware of the dangerous situation in the road 400 or an intersection ahead of the driver, thereby improving safety.

When the transmission unit 190 sends the results of the integrated processing to a central server and an intelligent server having local server functionality, the results of the integrated processing provided to the other information servers may be utilized in a variety of ways, as in an automatic guidance service, a dangerous vehicle alarm service, an obstacle information provision service, and a pedestrian alarm service. In this case, the other information servers provide a variety of types of service using location information based on object types included in the results of the integrated processing.

Figure 11:
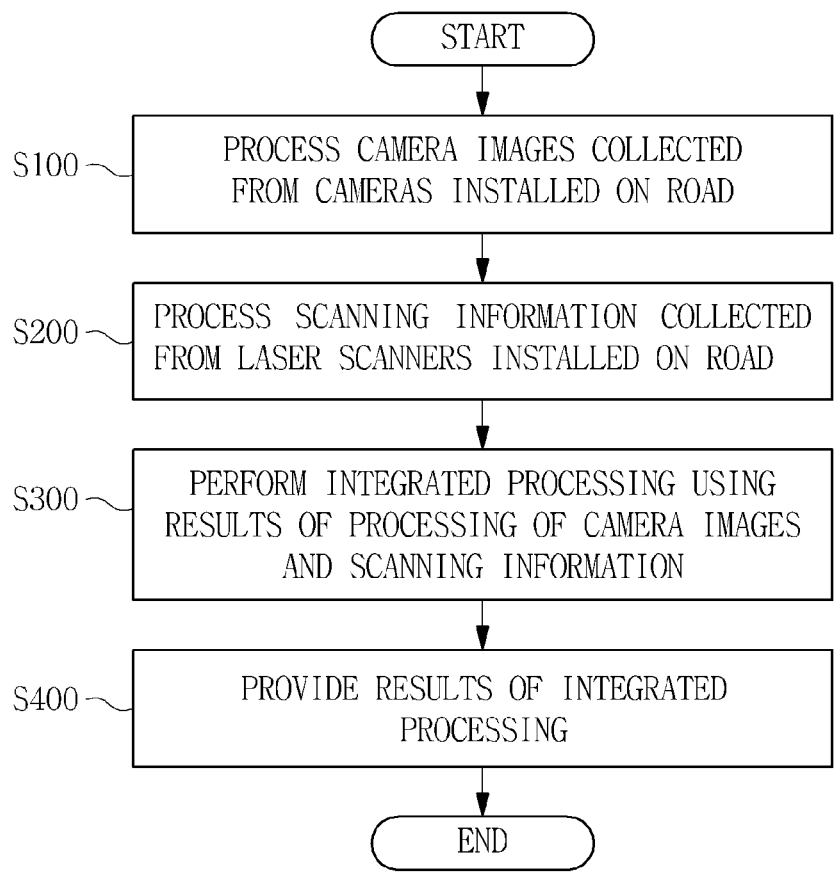
FIG. 11 is a flowchart illustrating a method of processing the data of heterogeneous sensors in an integrated manner to classify objects on a road and detect the locations of the objects according to an embodiment of the present invention.
Figure 12:
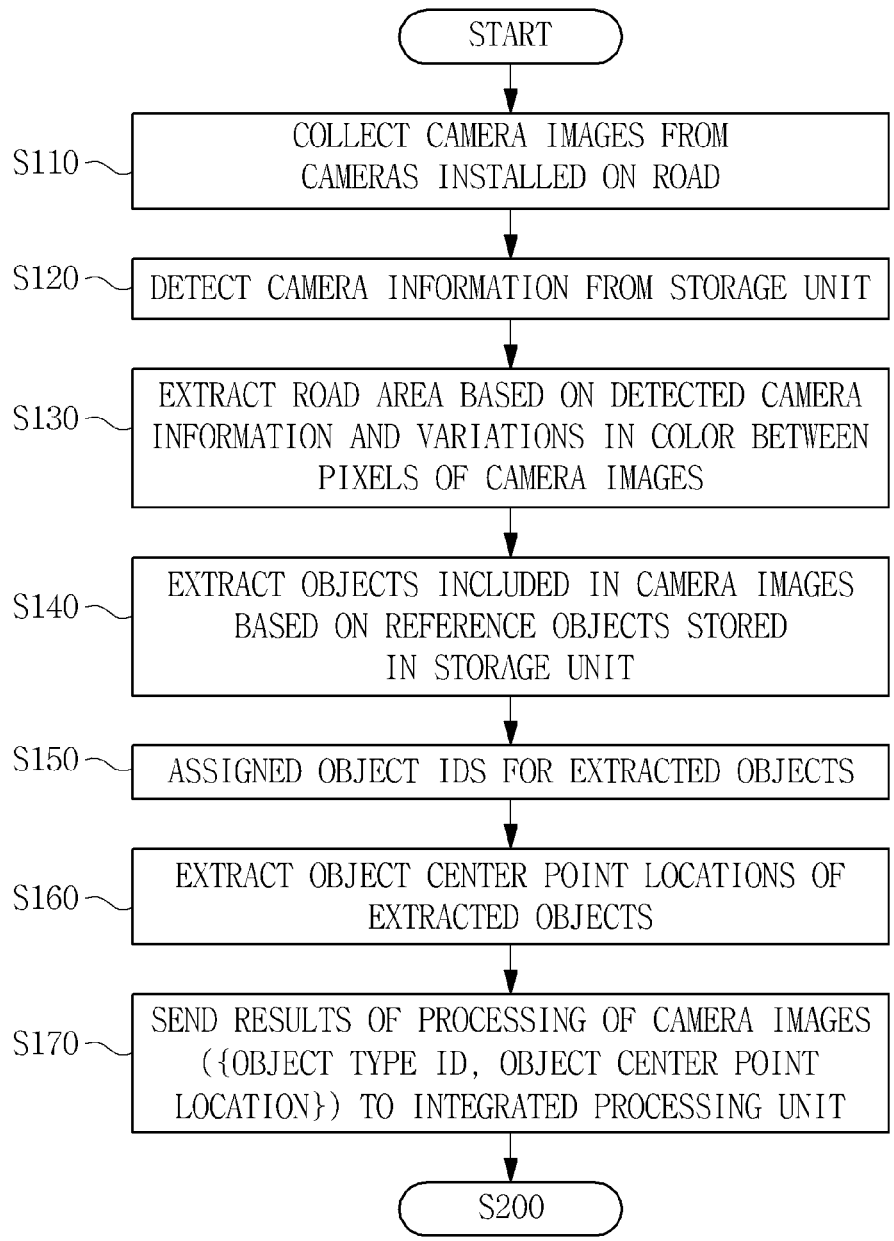
FIG. 12 is a flowchart illustrating the camera image processing step of FIG. 11.
Figure 13:
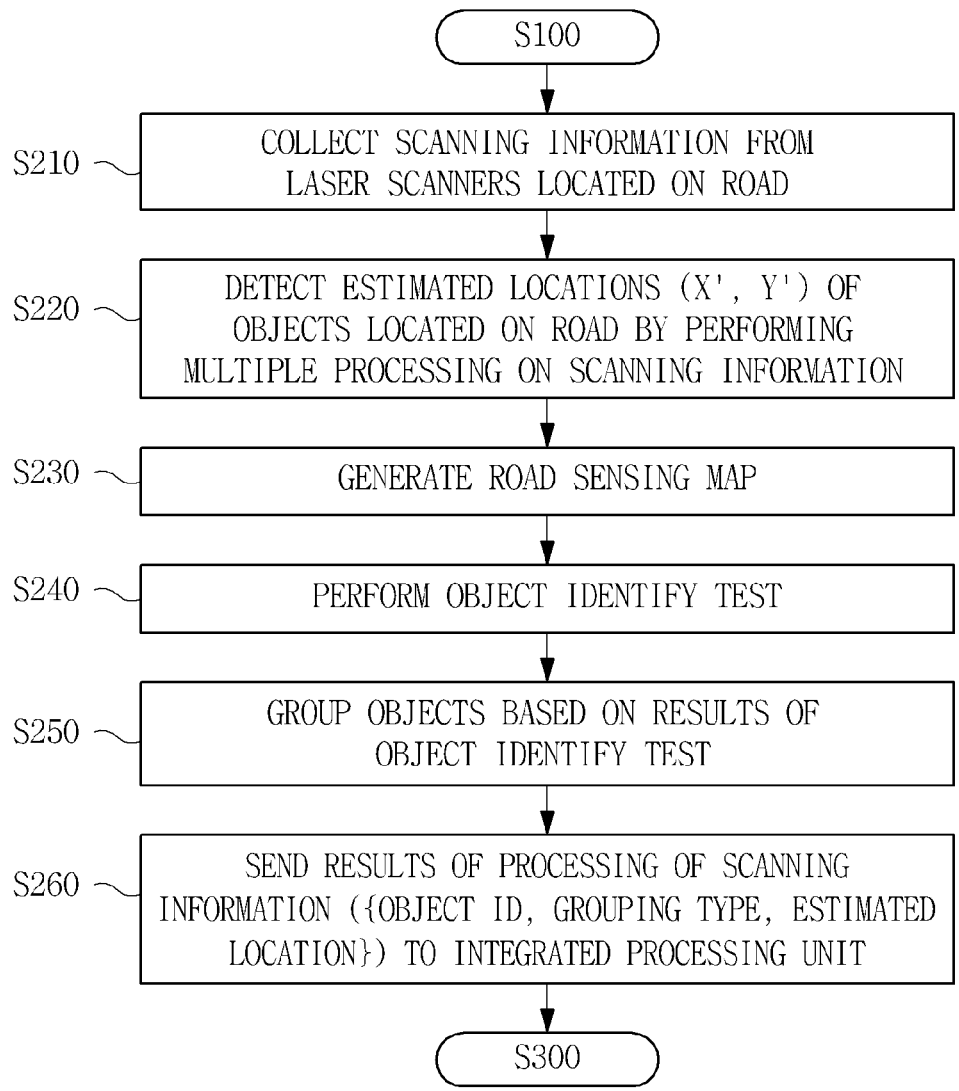
FIG. 13 is a flowchart illustrating the scanning information processing step of FIG. 11.
Figure 14:
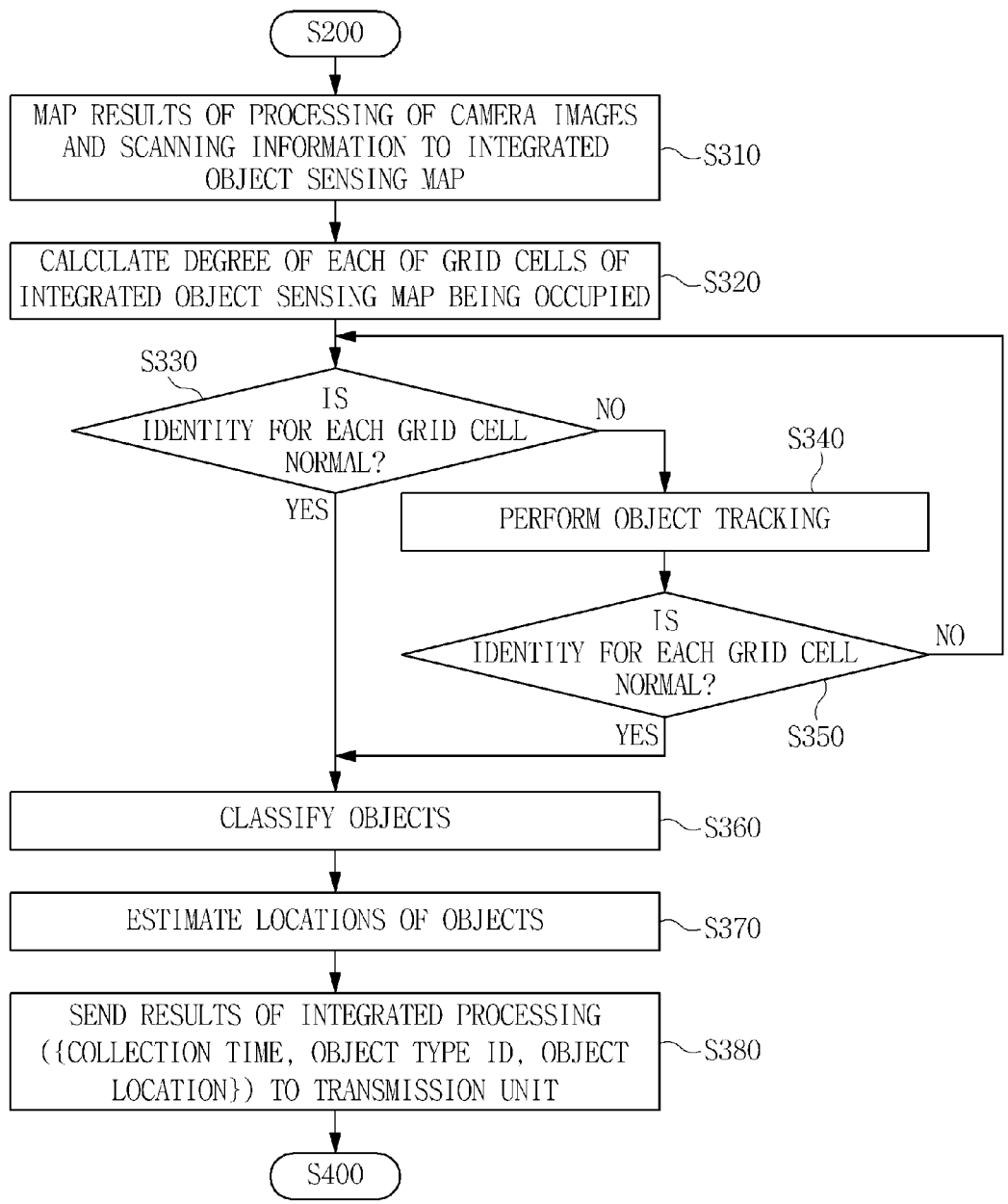
FIG. 14 is a flowchart illustrating the integrated processing step of FIG. 11.

A method of processing the data of heterogeneous sensors in an integrated manner to classify objects on a road and detect the locations of the objects according to an embodiment of the present invention will now be described in detail with reference to the accompanying drawings. FIG. 11 is a flowchart illustrating a method of processing the data of heterogeneous sensors in an integrated manner to classify objects on a road and detect the locations of the objects according to an embodiment of the present invention. FIG. 12 is a flowchart illustrating the camera image processing step of FIG. 11, FIG. 13 is a flowchart illustrating the scanning information processing step of FIG. 11, and FIG. 14 is a flowchart illustrating the integrated processing step of FIG. 11.

First, the camera image processing unit 110 processes camera images collected from the cameras 200 installed on the road 400 at step S100. The step of processing camera images will be described in greater detail below with reference to FIG. 12.

The camera image processing unit 110 collects camera images from the one or more cameras 200 installed on the road 400 at step S110. That is, the cameras 200 installed on the road 400 capture images of the road 400, and send the images to the camera image processing unit 110 via a wired/wireless network. Accordingly, the camera image processing unit 110 collects camera images, that is, the images captured by the one or more cameras 200.

The camera image processing unit 110 detects camera information from the storage unit 170 at step S120. Here, the camera image processing unit 110 detects camera information, including the sensor number, location (X, Y), height and camera angle θ of each of the cameras, from the storage unit 170.

The camera image processing unit 110 extracts the road area based on the detected camera information and variations in color between pixels of the camera images at step S130. That is, the camera image processing unit 110 detects the sensible length of the road 400 using the height and angle of the camera 200 included in the camera information. The camera image processing unit 110 detects the width of the road 400 using variations in color between the individual pixels of the camera images. In this case, the camera image processing unit 110 detects a road area and a non-road area using the variations in color between the individual pixels of the camera images. The camera image processing unit 110 detects the width of the road area as the width of the road 400 using the variations in color between the individual pixels of the camera images of the detected road area.

The camera image processing unit 110 extracts one or more objects included in the camera image based on reference objects stored in the storage unit 170 at step S140. That is, the camera image processing unit 110 extracts one or more objects by comparing the reference objects stored in the storage unit 170 with the pixel groups of the camera images. For this purpose, the camera image processing unit 110 detects the reference objects of a vehicle, a human, and obstacles from the storage unit 170. The camera image processing unit 110 detects one or more objects corresponding to a vehicle, one or more objects corresponding to a human, and/or one or more objects corresponding to one or more obstacles from the camera images by comparing the detected reference objects with the pixel groups of the camera images.

The camera image processing unit 110 sets object type IDs for the extracted objects at step S150. That is, the camera image processing unit 110 set IDs for respective object types of the previously detected objects. That is, the camera image processing unit 110 sets object type IDs, which were set for reference objects, that is, comparison objects, for the detected objects.

The camera image processing unit 110 extracts the object center locations of the extracted objects at step S160. That is, the camera image processing unit 110 converts the extracted objects into rectangles. The camera image processing unit 110 detects the location at which the diagonals of each of the resulting rectangles intersect each other as the object center location of a corresponding object.

The camera image processing unit 110 sends the results of the camera image processing to the integrated processing unit 150 at step S170. That is, the camera image processing unit 110 sends the results of the camera image processing, including the set object type IDs and the detected object center locations, to the integrated processing unit 150.

The scanning information processing unit 130 processes scanning information collected from the laser scanners 300 installed on the road 400 at step S200. The step of processing scanning information will be described in greater detail below with reference to FIG. 13.

The scanning information processing unit 130 collects scanning information from the laser scanners 300 installed on the road 400 at step S210. The scanning information processing unit 130 receives scanning information, including information about the distances to the objects 500 at each angle, from the laser scanners 300 installed on the road 400.

The scanning information processing unit 130 detects the estimated location (X', Y') of each of the objects 500 located on the road 400 by performing multiple data processing on the collected scanning information at step S220. That is, the scanning information processing unit 130 detects laser scanner information associated with a sensor number that is the same as that of each of the laser scanners 300, from the storage unit 170. Here, the scanning information processing unit 130 detects laser scanner information, including information about the location of each laser scanner 300 (that is, the latitude and longitude thereof), from the storage unit 170. The scanning information processing unit 130 detects the estimated location (X', Y') of each of the objects 500, that is, absolute location values, using information about the location of each of the laser scanners included in the laser scanner information and information about a distance and directional angle regarding each of the objects 50 A and B included in the scanning information.

The scanning information processing unit 130 generates a road sensing map at step S230. That is, the scanning information processing unit 130 generates a road sensing map using information about the road 400 stored in the storage unit 170. The scanning information processing unit 130 may generate a road sensing map using the direction vector of the motion of each of the objects over time while taking into consideration the test drive of a vehicle or an initial driving situation over a specific period of time. Here, the road sensing map is a map that functions as a criterion that is used to determine which area the road area belongs to.

The scanning information processing unit 130 performs an object identity test at step S240. For this purpose, the scanning information processing unit 130 continuously monitors data about the road area using the generated road map. The scanning information processing unit 130 tests each moving object for object identity using the results of the monitoring. That is, the scanning information processing unit 130 detects the sizes and distribution of the sensing points of each moving object, such as a vehicle, a pedestrian, or some other obstacle, over time. The scanning information processing unit 130 tests for object identity using the detected sizes and distribution of the sensing points of the moving obstacle. At this time, the scanning information processing unit 130 tests for object identity while taking into consideration the minimum distance (minimum radius) of the estimated location (X', Y') of each of the objects 500. The scanning information processing unit 130 sets the same object ID for objects that have been estimated to be the same by the identity test.

The scanning information processing unit 130 groups the objects 500 based on the results of the object identity tests at step S250. That is, the scanning information processing unit 130 groups the objects with respect to objects for which the same object ID has been set while taking into account the minimum and maximum values of the size. In this case, the scanning information processing unit 130 groups the objects depending on the types of vehicles, such as passenger vehicles and large-sized vehicles, and depending on whether they are pedestrians or the other objects.

The scanning information processing unit 130 sends the results of the processing of the scanning information to the integrated processing unit 150 at step S260. That is, the scanning information processing unit 130 sends the results of the processing of the scanning information in the form of {object ID, grouping type, estimated location (X', Y'), estimated location (X', Y')} to the integrated processing unit 150.

The integrated processing unit 150 performs integrated processing based on the results of the processing of the camera images and the results of the processing of the scanning information at step S300. That is, the integrated processing unit 150 generates object types, such as vehicle types, a human, and the others, based on the results of the processing of the camera images and the results of the processing of the scanning information. The integrated processing unit 150 generates the accurate locations (X, Y) of the respective objects based on the results of the processing of the camera images and the results of the processing of the scanning information. The step of performing integrated processing will be described in detail below with reference to FIG. 14.

The integrated processing unit 150 maps the received results of the processing of the camera images and the results of the processing of the scanning information to the integrated object sensing map at step S310. That is, the integrated processing unit 150 maps the results of the processing of the camera images {object type ID, object center location} and the results of the processing of the scanning information {object ID, grouping type, estimated location (X', Y') . . . , estimated location (X', Y')} to the integrated object sensing map. The integrated processing unit 150 maps the objects 500 to the road map formed in a grid structure based on the center point and estimated locations of the objects 500. Here, information about the size of an occupied area is approximately set for each object type ID that is collected from the results of the processing of the camera images. That is, the integrated processing unit 150 previously stores the size of an occupied area for each object type ID, for example, approximately 2 m×4.5 m for a passenger vehicle, 2.5 m×12 m for a bus, and 50 cm×50 cm for a human. The integrated processing unit 150 calculates the size of the area occupied by each object using the size of the occupied area for each object type ID and its center point location. The integrated processing unit 150 maps each object to the integrated object sensing map using the calculated size of the area occupied by the object and its center point location.

The integrated processing unit 150 calculates the degree of each of the grid cells of the integrated object sensing map being occupied at step S320. That is, the integrated processing unit 150 calculates the period and probability of each of the grid cells of the integrated object sensing map, to which the objects have been mapped, being occupied. In this case, the integrated processing unit 150 calculates the period and probability of each of the grid cells of the integrated object sensing map being occupied depending on the locations of the objects for a specific period of time.

The integrated processing unit 150 determines the identity for each grid cell based on the calculated degree of the grid cell being occupied. That is, the integrated processing unit 150 compares the probability of the grid cell being occupied based on the results of the processing of the camera images with a set threshold value. The integrated processing unit 150 compares the probability of the grid cell being occupied based on the results of the processing of the scanning information with a set threshold value. The integrated processing unit 150, if the probabilities of being occupied based on the results of the processing of the camera images and the results of the processing of the scanning information are equal to or higher than the set threshold values, respectively, determines the identity for the grid cell depending on whether the two groups of results are present in the grid cell. Here, the integrated processing unit 150 determines whether the corresponding grid cell is occupied by the same object by comparing a corresponding object type ID of the results of the processing of the camera images with a corresponding object ID of the results of the processing of the scanning information. The integrated processing unit 150 determines that the identity for the grid cell is normal if the corresponding grid cell is occupied by the same object, and determines that the identity for each grid cell is abnormal if the corresponding grid cell is not occupied by the same object. If it is determined that the identity for the grid cell is abnormal at step S330 (NO), the integrated processing unit 150 performs object tracking at step S340. That is, if the motion of an object is detected in a subsequent sensing period, the integrated processing unit 150 determines the identity for each grid cell again by comparing a corresponding object type ID of the results of the processing of the camera images with a corresponding object ID of the results of the processing of the scanning information.

In this case, if the identity for each grid cell is abnormal even after object tracking, the integrated processing unit 150 performs object tracking in a subsequent period. If the identity for each grid cell is abnormal in this period, the integrated processing unit 150 performs identity determination again.

If, as a result of the re-determination, it is determined that the grid object identity is normal at step S350 (YES), the integrated processing unit 150 performs object classification at step S360. That is, the integrated processing unit 150 sets the corresponding object type ID of the results of the processing of the camera images as the corresponding grid cell value in the corresponding sensing period.

The integrated processing unit 150 estimates the locations of the classified objects at step S370. Here, once an object type ID has been set for each grid cell by the determination of the identity for the grid cell, the integrated processing unit 150 sets the average representative location of estimated locations (that is, {estimated location (X', Y'), . . . , estimated location (X', Y')}) collected from the results of the processing of the laser scanning-related information as the final location of the corresponding object.

The integrated processing unit 150 sends the results of the integrated processing to the transmission unit 190 at step S380. Here, the integrated processing unit 150 sends the results of the integrated processing, including {collection time, object type ID, object location}, to the transmission unit 190.

The transmission unit 190 provides the results of the integrated processing of the integrated processing unit 150 to a driver and/or other information servers at step S400. That is, the transmission unit 190 sends the results of the integrated processing, including collection times, object type IDs, and object locations, to a driver and/or other information servers. Here, when the transmission unit 190 sends the results of the integrated processing to the driver, it may directly notify the driver of a danger via wireless V2I communication. This enables the driver to become aware of the dangerous situation in the road 400 or an intersection ahead of the driver, thereby improving safety. When the transmission unit 190 sends the results of the integrated processing to a central server and an intelligent server having local server functionality, the results of the integrated processing provided to the other information servers may be utilized in a variety of ways, as in an automatic guidance service, a dangerous vehicle alarm service, an obstacle information provision service, and a pedestrian alarm service. In this case, the other information servers provide a variety of types of service using location information based on object types included in the results of the integrated processing.

As described above, the apparatus and method for processing the data of heterogeneous sensors in an integrated manner to classify objects on a road and detect the locations of the objects have the effects of increasing the accuracy of the classification of objects on a road and detecting the accurate locations of the objects because it processes information collected using heterogeneous sensors in an integrated manner, thereby classifying the objects on the road and detecting the locations of the objects.

Furthermore, the apparatus and method for processing the data of heterogeneous sensors in an integrated manner to classify objects on a road and detect the locations of the objects have the effect of increasing the reliability of the classification of objects on a road and the detection of the locations of the objects because it processes information collected using heterogeneous sensors in an integrated manner, thereby classifying the objects on the road and detecting the locations of the objects.

Furthermore, the apparatus and method for processing the data of heterogeneous sensors in an integrated manner to classify objects on a road and detect the locations of the objects have the effect of being able to provide real-time obstacle information via wireless V2I communication-based information exchange on a road on which heterogeneous sensors have been installed, ultimately providing an autonomous driving service to each vehicle depending on the type and/or location of the vehicle based on the reliable classification of objects and the reliable detection of the locations of the objects.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for processing data of heterogeneous sensors in an integrated manner to classify one or more objects on a road and detect locations of the objects, the apparatus comprising:
    a camera image processing unit configured to generate results of processing of camera images based on the camera images collected from one or more cameras installed on the road;
    a scanning information processing unit configured to generate results of processing of scanning information based on the scanning information collected from one or more laser scanners installed on the road; and
    an integrated processing unit configured to generate types and final locations of the objects located on the road by processing the generated results of the processing of the camera images and the generated results of the processing of the scanning information in an integrated manner;
    wherein the integrated processing unit:
    maps the objects on the road to an integrated object sensing map composed of grid cells based on the results of the processing of the camera images and the results of the processing of the scanning information;
    calculates a period and probability of each of grid cells of the integrated object sensing map, to which the objects have been mapped, being occupied;
    if the calculated probability of being occupied is equal to or higher than a set threshold value, determines an identity for each grid cell by comparing an object type ID of an object occupying the grid cell with an object ID of the object, and, if the identity for each grid cell is normal, sets an object type ID for the grid cell; and
    sets an average representative location of estimated locations of the results of processing of the laser scanner-related information as a final location of a corresponding object.

2. The apparatus of claim 1, wherein the camera image processing unit:
    detects a length of a sensible road based on a height and angle of each of the installed cameras included in previously stored camera information; and
    detects a road area and a non-road area based on variations in color between pixels of the received camera images and then detects a width of the road.

3. The apparatus of claim 1, wherein the camera image processing unit:
    detects types of objects located on the road based on previously stored reference objects and pixel groups of the camera images, and sets an object type ID for each of the objects based on the detected types of objects;
    converts the objects detected from the camera images into rectangles, and detects a location in which diagonals of each of the resulting rectangles intersect each other as an object center location of a corresponding object; and
    generates the results of the processing of the camera images including object type IDs and object center locations of the objects located on the road.

4. The apparatus of claim 1, wherein the scanning information processing unit detects estimated locations of the objects located on the road by performing multiple data processing on location information included in laser scanner information associated with sensor numbers of the laser scanners and the received scanning information.

5. The apparatus of claim 1, wherein the scanning information processing unit:
generates a road sensing map based on a direction vector of motion of each of the objects depending on a test drive or an initial driving situation of a vehicle over a predetermined period of time or based on previously stored road information;
classifies the objects located on the road as one or more moving objects and/or one or more fixed objects based on data monitoring of the road area based on the generated road sensing map, and detects sizes and a distribution of sensing points of the moving objects and the fixed objects; and
performs an object identity test based on sizes and a distribution of the detected sensing points, sets object IDs, and groups the objects based on the set object IDs.

6. The apparatus of claim 1, wherein the scanning information processing unit generates the results of the processing of the scanning information including object IDs, types of grouping, and estimated locations.

7. The apparatus of claim 1, wherein the integrated processing unit generates results of the integrated processing including collection times, object type IDs and object locations.

8. The apparatus of claim 1, further comprising:
a storage unit configured to store heterogeneous sensor information including at least one of a sensor type, location, height and angle of each of the installed cameras and laser scanners, and a road number on which each of the installed cameras and laser scanners is installed; and road information including at least one of a road number, a start node, an end node, and a number of traffic lanes.

9. The apparatus of claim 1, further comprising a transmission unit configured to send results of the integrated processing generated by the integrated processing unit to a vehicle or one or more other information servers.

10. A method of processing data of heterogeneous sensors in an integrated manner to classify one or more objects on a road and detect locations of the objects, the method comprising:
generating, by a camera image processing unit, results of processing of camera images based on the camera images collected from one or more cameras installed on the road;
generating, by a scanning information processing unit, results of processing of scanning information based on the scanning information collected from one or more laser scanners installed on the road; and
generating, by an integrated processing unit, types and final locations of the objects located on the road by processing the generated results of the processing of the camera images and the generated results of the processing of the scanning information in an integrated manner;
wherein the generating types and final locations of the objects comprises:
mapping, by the integrated processing unit, the received results of the processing of the camera images and the received results of the processing of the scanning information to an integrated object sensing map;
calculating, by the integrated processing unit, a period and probability of each of grid cells of the integrated object sensing map being occupied;
determining, by the integrated processing unit, an identity for each grid cell based on the calculated probability of the grid cell being occupied;
if the identity for each grid cell is normal, classifying, by the integrated processing unit, the objects for the corresponding grid cells;
estimating, by the integrated processing unit, locations of the classified objects; and
generating, by the integrated processing unit, results of the integrated processing.

11. The method of claim 10, wherein the generating the results of the processing of the camera images comprises:
extracting, by the camera image processing unit, a road area based on camera information detected from a storage unit and variations in color between pixels of the camera images;
extracting, by the camera image processing unit, the objects from the camera images based on reference objects stored in the storage unit;
detecting, by the camera image processing unit, the types of objects on the road based on previously stored reference objects and pixel groups of the camera images, and then setting, by the camera image processing unit, object type IDs for the objects;
converting, by the camera image processing unit, the extracted objects into rectangles, and then extracting, by the camera image processing unit, a location at which diagonals of each of the rectangles intersect each other as an object center location of a corresponding object; and
generating, by the camera image processing unit, the results of the processing of the camera images including the set object type IDs and object center locations.

12. The method of claim 11, wherein the extracting a road area comprises:
detecting, by the camera image processing unit, camera information including a height and angle of each of the installed cameras from the storage unit;
detecting, by the camera image processing unit, a length of a sensible road based on the detected camera information;
detecting, by the camera image processing unit, a road area and a non-road area based on variations in color between pixels of the received camera images; and
detecting, by the camera image processing unit, a width of the road based on the detected road area and non-road area.

13. The method of claim 10, wherein the generating results of the processing of the scanning information comprises:
detecting, by the scanning information processing unit, estimated locations of the objects on the road by performing multiple data processing on laser scanner information and the scanning information;
generating, by the scanning information processing unit, a road sensing map based on a direction vector of motion of each of the objects depending on a test drive or an initial driving situation of a vehicle over a predetermined period of time or based on previously stored road information;
performing, by the scanning information processing unit, an object identity test based on sizes and a distribution of sensing points of the objects mapped to the generated road sensing map;
grouping, by the scanning information processing unit, objects based on results of the object identity test; and
generating, by the scanning information processing unit, the results of the processing of the scanning information including object IDs, types of grouping, and the estimated locations.

14. The method of claim 13, wherein:
the performing an object identity test comprises setting, by the scanning information processing unit, a same object ID for same objects; and
the grouping the objects comprises grouping, by the scanning information processing unit, the objects for which the same object ID has been set as a group.

15. The method of claim 10, wherein the determining an identity for each grid cell comprises:
comparing, by the integrated processing unit, the calculated probability of being occupied with a set threshold value;
if the probability of being occupied is equal to or higher than the set threshold value, determining, by the integrated processing unit, the identity for each grid cell by comparing an object type ID of an object occupying the corresponding grid cell with an object ID of the object; and
if the identity for each grid cell is normal, setting, by the integrated processing unit, an object type ID for the corresponding grid cell.

16. The method of claim 10, wherein the estimating locations of the objects comprises setting, by the integrated processing unit, an average representative location of estimated locations of the results of processing of the laser scanner-related information as a final location of a corresponding object.

17. The method of claim 10, wherein the generating the results of the integrated processing comprises generating, by the integrated processing unit, results of the integrated processing including collection times, object type IDs and object locations.

18. The method of claim 10, further comprising sending, by a transmission unit, results of the integrated processing generated by the integrated processing unit to a vehicle or one or more other information servers.

* * * * *